United States Patent [19]

Straub

[11] 3,985,398
[45] Oct. 12, 1976

[54] FLUIDIC ANTISKID CIRCUIT

[75] Inventor: Henrik H. Straub, Mercer Island, Wash.

[73] Assignee: The United States of America as represented by the Secretary of the Air Force, Washington, D.C.

[22] Filed: Apr. 8, 1975

[21] Appl. No.: 566,158

[52] U.S. Cl. ............................. 303/21 CG; 137/805; 188/181 A; 244/111
[51] Int. Cl.² .......................................... B60T 8/04
[58] Field of Search ........................... 137/804, 805; 188/181 C, 181 A; 235/200 PF, 201 PF; 244/111; 303/20, 21

[56] References Cited
UNITED STATES PATENTS

| | | |
|---|---|---|
| 3,495,881 | 2/1970 | Harned et al. ................... 303/21 F |
| 3,545,817 | 12/1970 | Yarber ............................. 303/21 P |
| 3,576,351 | 4/1971 | Collins ............................ 303/21 F |
| 3,600,043 | 8/1971 | Kasselmann ..................... 303/21 F |
| 3,608,572 | 9/1971 | Hass ................................. 137/805 |
| 3,669,508 | 6/1972 | Attri ................................ 303/21 R |
| 3,689,120 | 9/1972 | Sumiyoshi et al. ......... 303/21 CH X |
| 3,716,273 | 2/1973 | Beyerlein ...................... 303/21 CG |
| 3,717,384 | 2/1973 | Harned .......................... 303/21 BE |
| 3,850,480 | 11/1974 | Atkins ........................... 303/21 CG |

Primary Examiner—Stephen G. Kunin
Attorney, Agent, or Firm—Joseph E. Rusz; Henry S. Miller

[57] ABSTRACT

A pneumatic wheel speed sensor provides pulse frequency signal proportional to wheel speed, the signal is converted to DC signal and differentiated and compared to commanded deceleration, error which causes modulation of brake pressure. Excessive deceleration causes a digital amplifier to switch into the system an integrator resulting in rapid brake pressure signal decrease. A second order lead protects against undesirable landing gear oscillation in aircraft applications.

1 Claim, 2 Drawing Figures

FLUIDIC ANTISKID CIRCUIT

STATEMENT OF GOVERNMENT INTEREST

The invention described herein may be manufactured and used by or for the Government for governmental purposes without the payment of any royalty thereon.

BACKGROUND OF THE INVENTION

This invention relates generally to systems for the prevention of vehicular skidding and more particularly to a fluidic antiskid system that will function under adverse conditions.

Due to the increase in technology in the field of all weather landing systems, it is now possible for aircraft to land under conditions hitherto not possible. However, when the aircraft has reached the runway, another hazard presents itself in the form of skidding because of wet, snow or ice covered surfaces. As aircraft grow larger, landing speeds increase and the need for a suitable antiskid system increases.

All vehicular antiskid systems must, in one manner or another come in direct contact with the braking system of each wheel of the vehicle. Because of the high energy disipation involved in braking systems, the wheel units constitute a hostile environment for most electrical components. The heavier the vehicle the more severe the temperature ranges in the braking system. For example, a small automobile would necessarily produce less heat than a large aircraft, all other factors being equal. Coincident with the effects of heat are the deleterious effects of vibration on any wheel mounted equipment. The vehicle whether large or small will be subject to substantial shocks and pounding from both constant highway travel and runway landings.

In addition to the problem of suitable construction materials, antiskid systems utilized in aircraft must compensate for the destructive effects of "gear walk". All antiskid systems involve some type of speed sensing, and the ultimate controlled application and release of appropriate braking systems. Since this is a rapid function frequently a harmonic frequency is created between the braking system and the natural flexing of the landing gear called "gearwalk". Unless controlled, this harmonic could damage the landing carriage and cause loss of effective ground control during stopping.

SUMMARY OF THE INVENTION

The invention utilizes a new and improved combination of fluidic components to achieve antiskid effects in vehicles. Fluidic components operate under the adverse effects of temperature and vibration that tend to shorten the life of prior art systems. These components facilitate the construction of an integrated antiskid system by placing the brake control system in very close proximity with the brake.

In general, a wheel speed signal enters the circuit and is differentiated to result in a wheel deceleration factor. A command rate of deceleration is sent to the system and the difference between the actual deceleration factor and the command rate level of deceleration is fed into an integrator which then modulates the pressure sent to the braking system for that wheel.

In operation, if actual wheel deceleration exceeds certain set values, skid detectors sense the tendency for the wheel to lock up. When incipient skid is sensed, the detectors act to release pressure on the appropriate brakes and reset the integrator to a lower value.

When the system is utilized with aircraft, the additional factor of "gear walk" must be taken into account. In order to compensate for harmonics generated between the vibrations of the landing gear and the pulsing action of the antiskid system, a second order circuit is provided which is tuned to each particular aircraft's landing gear. The second order circuit anticipates the deceleration rate and avoids the buildup of destructive harmonics.

It is therefore an object of the invention to provide a new and improved fluidic antiskid circuit.

It is another object of the invention to provide a new and improved antiskid circuit that functions in the hostile environment of heat and vibration.

It is a further object of the invention to provide a new and improved antiskid circuit that obtains maximum traction at the surface-tire interface.

It is still another object of the invention to provide a new and improved antiskid circuit that provides for damping to protect against undesirable gear oscillations.

It is still a further object of the invention to provide a new and improved antiskid circuit that will provide an increased lifetime over those known in the art.

It is another object of the invention to provide a new and improved fluidic antiskid circuit having improved performance characteristics over known similar circuits.

It is another object of the invention to provide a fluidic antiskid circuit which is economical to produce and utilizes conventional currently available components that lend themselves to standard mass production manufacturing techniques.

These and other advantages, features and objects of the invention will become more apparent from the following description in connection with the illustrative embodiment in the accompanying drawings.

DESCRIPTION OF THE PREFERRED EMBODIMENT

Figure 1:
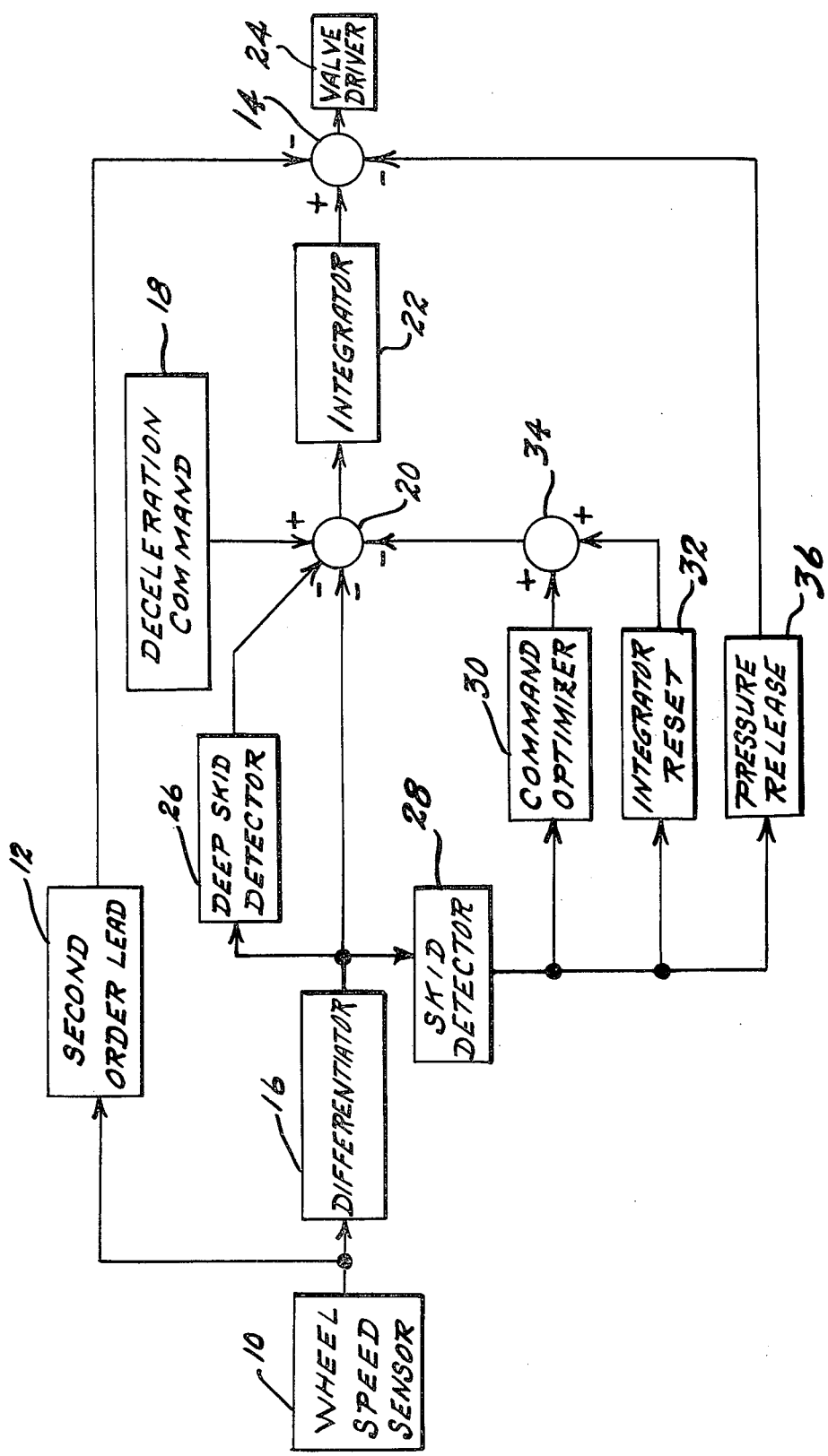
FIG. 1 is a block diagram of the invention.

Referring now to FIG. 1, a pneumatic wheel speed sensor 10 provides a pulse frequency which is directly proportional to wheel speed. The pulse frequency is converted to a DC signal in the circuit. The signal is differentiated at 16 and provides a wheel deceleration signal for computation purposes. The actual deceleration is compared to a command deceleration 18 in the summer 20 and the resulting error drives the integrator 22, summer 14 and valve driver 24 to modulate the brake pressure.

In the event that wheel deceleration becomes excessive, it is sensed at the skid detector 26, a digital amplifier 28 is switched into the integrator, resulting in a rapid decrease in brake pressure signal thereby keeping a skid at a minimum level, two such digital amplifiers are provided to switch at a different wheel deceleration. The second digital amplifier includes skid detector 28 which functions in cooperation with the command optimizer 30 and integrator reset 32 whose outputs are summed at 34 and sent to the summer 20. The pressure release subsystem is connected directly to the summer 14 bypassing the integrator 22.

A circuit providing the derivative of deceleration is shown as the second order lead 12 this provides damping to protect against undesirable landing gear oscillations. The valve driver 24 delivers a signal to an interface valve which converts anti skid signals to corresponding brake pressures.

Figure 2:
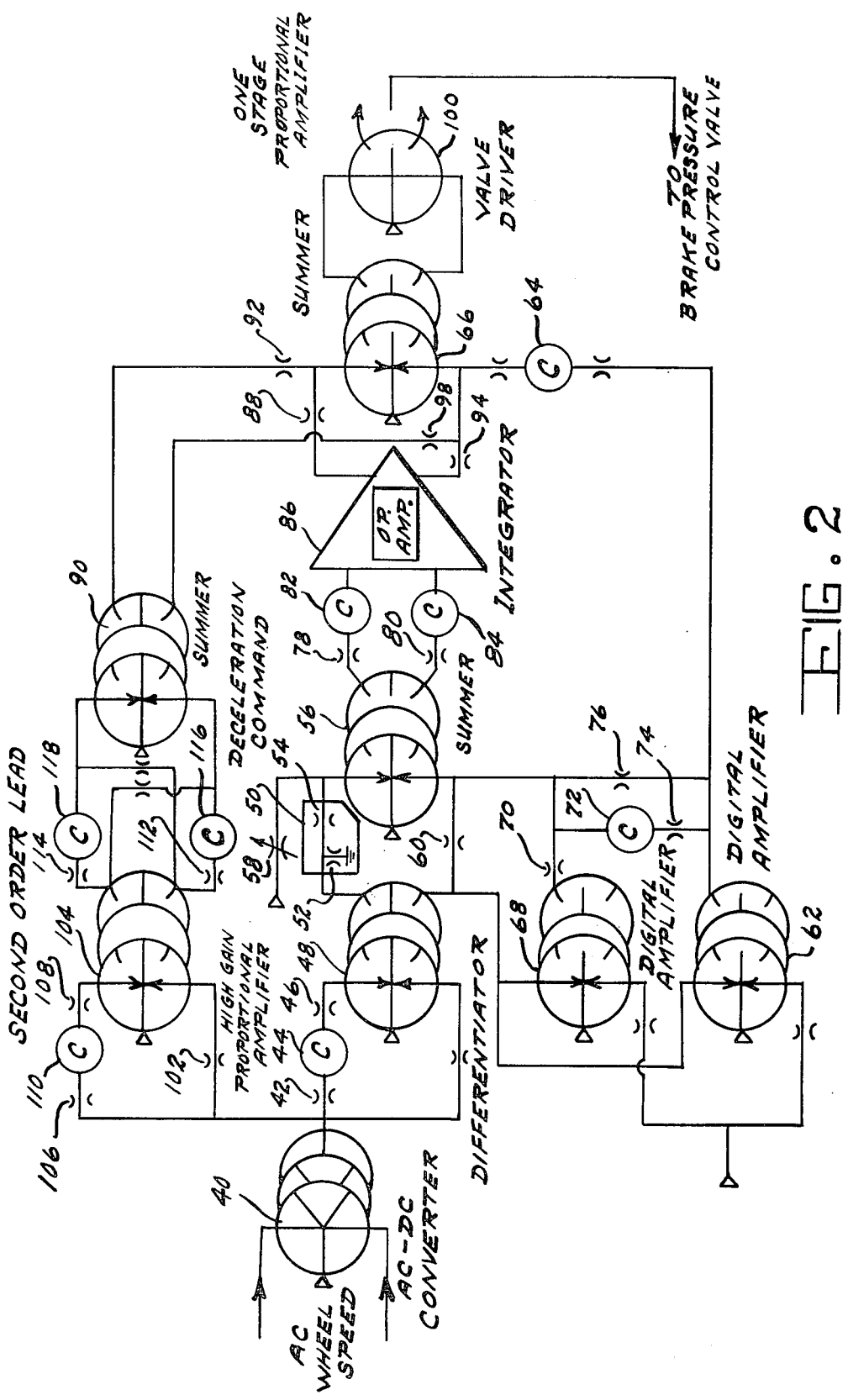
FIG. 2 is a flow diagram of the invented circuit.

Concerning FIG. 2, the AC wheel speed signal is fed to the AC-DC converter 40, thence through the orifices 42, 46 and the air volume capacitor 44 and on into the differentiator 48. The output of the differentiator is fed through the deep skid detector, consisting of orifices 52 and 54 to the summer 56. Also fed to the summer through the variable orifice 58 is the deceleration command. The output from the differentiator is also fed through the orifice 60 directly to the summer 56. The output then continues as input to the digital amplifier 62 which is effectively a bi-stable amplifier. The output of the amplifier 62 is sent through the capacitor 64 to the summer 66. The digital amplifier 68 receives input from the differentiator 48 and provides an output which, after passing through the orifice 70 combines with the output from the amplifier 62 as modified by the capacitor 72, and orifices 74, 76 to provide additional input to the summer 56. Output from the summer 56 is fed through orifices 78 and 80 and volume capacitors 82 and 84 in separate channels to the operational amplifier-integrator 86.

Output from the integrator is fed through orifice 88 where the signal is combined with the signal from the second order lead, summer 90 after passing through orifice 92 and thence to the summer 66. The second output of the integrator passes through the orifice 94, is combined with the second output from the summer 90 after passing through the orifice 98. The combined signal is then joined with the signal from the digital amplifier 62 and sent to the summer 66. The output of the summer 66 is then fed via two channels to the valve driver 100 which is in practice a one stage proportional amplifier. The output of the valve driver is then fed to the appropriate brake pressure control valve.

The second order lead receives a signal from the AC-DC converter 40 where the signal is split taking one leg of the circuit passing it through orifice 102 to the high-gain proportional amplifier 104. The second leg of the circuit passes through orifices 106, 108 and air volume capacitor 110 into the amplifier 104. The amplifier output is modified by the restrictive orifices 112, 114 and capacitors 116, 118, and sent to the summer is combined with output from the integrator 86 as explained hereinbefore.

Having thus described my fluidic antiskid circuit, I make the following claims of the invention:

1. A fluidic antiskid circuit comprising: a pneumatic wheel speed sensor connected to a wheel; means for determining the rate of deceleration of the wheel; means for comparing the rate of deceleration with a preselected rate of deceleration, and producing an output signal; valve means connected to a wheel braking system and adapted to receive said output signal whereby braking pressure is varied according to the deceleration rate, and means for detecting and compensating for excessive wheel deceleration, including a fluidic digital amplifier connected to said means for comparing deceleration rates.

* * * * *